(No Model.)
C. J. BROWN.
CHURN.
No. 262,732. Patented Aug. 15, 1882.
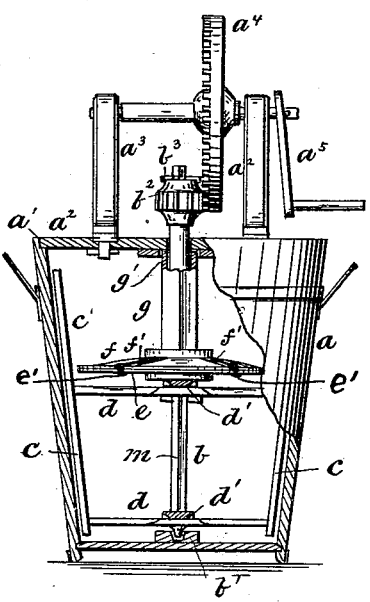
Fig. 1.
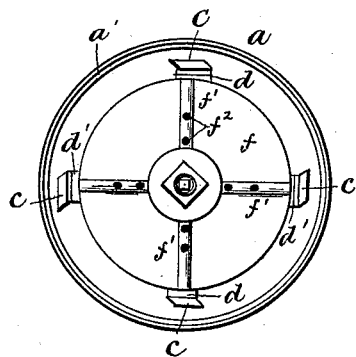
Fig. 3.
Fig. 4.
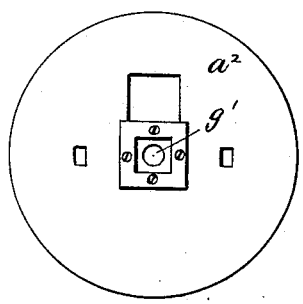
Fig. 2.
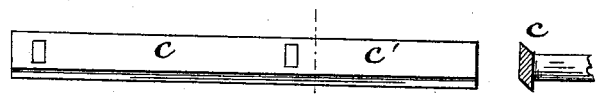
Fig. 5.
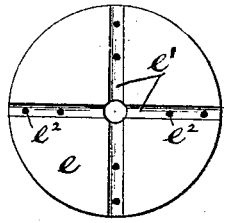
Fig. 6.
Witnesses:
O. B. Turpin.
F. W. Wheat
Inventor
Cyrus J. Brown
By R. S. & A. P. Lacey
Att'ys

UNITED STATES PATENT OFFICE.

CYRUS J. BROWN, OF MEADOW GAP, PENNSYLVANIA.

CHURN.

SPECIFICATION forming part of Letters Patent No. 262,732, dated August 15, 1882.

Application filed March 2, 1882. (No model.)

*To all whom it may concern:*

Be it known that I, CYRUS J. BROWN, a citizen of the United States, residing at Meadow Gap, in the county of Huntingdon and State of Pennsylvania, have invented certain new and useful Improvements in Churns; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

This invention has for its object to furnish a churn by which the milk will be broken by friction or compression.

It consists essentially in the two perforated suction-disks placed in contact, and made of a diameter less than the diameter of the churn, and submerged in the body of the milk and operated so as to draw the milk between them, from above and below, as will be described.

It consists, further, in constructing the disks with a series of radial channels perforated by openings, and having the surfaces between the said channels plain and arranged to rub one against the other, and arranging and operating the said disks below the surface of the body of the milk, as will be described; and it consists, further, in the combination and arrangement of other parts, all of which will be hereinafter fully explained.

In the drawings, Figure 1 is an elevation of a churn, part in section, showing the disks, the paddle-frame, and the operating mechanism. Fig. 2 shows the under side of the lid. Fig. 3 is a plan of the churn having the lid removed. Fig. 4 is a detail slightly enlarged, showing the disks separated; and Fig. 5 shows one of the vertical side bars of the paddle-frame, and Fig. 6 is a plan view of the under disk.

$a$ represents the churn, which I make by preference with its sides flared regularly from the bottom to the top. A churn-body having vertical sides can be used with good results, but better results are obtained by having the sides flared, as shown. The top of the churn-body is provided with a rabbet, $a'$, into which is snugly seated the lid $a^2$.

$a^3 a^3$ are supports fixed on the lids and arranged to carry the axle of the crown or bevel gear $a^4$, which drives the paddles or breakers and revolving disk, hereinafter described. The wheel $a^4$ is turned by a crank, $a^5$.

$b$ is the shaft, to which the paddles or breakers and one of the disks are fixed. The shaft has its lower end seated in a bearing, $b'$, on the bottom of the churn, while its upper end passes upward through a central opening in the lid $a^2$ and has on it a spur-pinion, $b^2$, which meshes with the driving-gear $a^4$. The pinion is formed with an angular opening which fits over the angular upper end of shaft $b$, and it is held in place by a removable key, $b^3$, so that it can be readily taken off, when desired.

$c c$ are a series of paddles or breakers supported on the ends of two series of horizontal arms, $d\ d'$, extended from the vertical shaft $b$. The breakers $c$ have their opposite ends beveled, the one on the inner and the other on the outer side, as shown in Figs. 3 and 5, and they set so as to be parallel with and close to the side of the churn.

It will be seen that the beveled edges of the breakers are arranged so that the one tends to give the milk an inward direction, while the other tends to throw it outward against the side of the churn. I use only four of these breakers, that number being sufficient for churns of ordinary capacity. A greater or less number than four could be used, if desired.

The breakers, as hereinbefore stated, are supported on the two upper and lower series of arms $d\ d'$. The lower series of arms are placed near the bottom of the churn, while the upper series are arranged near the middle (measuring upward from the bottom) of the churn. To be more exact, I place the upper series at such a height from the bottom that when the milk is put into the churn they, together with the disks, will be submerged one or more inches deep. The arms $d$ have their opposite edges beveled upward, while the alternate arms $d'$ have under bevels, so that the one arm acts to throw the milk in an opposite direction from that in which it is thrown by the alternate arm.

$e$ is the lower revolving friction-disk. It is fixed on and revolves with the shaft $b$. It is arranged above and close to the upper series of arms $d\ d'$. It is made slightly convex on its upper side, and is provided with a series of radial receiving-channels, $e'$, having suction-openings $e^2$ through from under into said channels. The diameter of the disk is a little less than the distance between any two opposite breakers $c$, there being just clearance between its periphery and the inner sides of said breakers.

$f$ is the upper disk, made to correspond in diameter with the disk $e$. It is made concave on its under side, so that it will fit snugly on the convex upper side of the lower disk. It is provided with a series of radial receiving-channels or grooves, $f'$, struck upward from the under side, and with a series of inlet or suction openings, $f^2$, made from the upper side through into the said channels $f'$. The disk $f$ is fixed on the lower end of a hollow shank, $g$, which slips down over the shaft $b$. The upper end of the shank is made angular in form, and extends to and fits into a mortise or recess, $g'$, provided on the under side of the lid. It is held by the mortise $g'$ and prevented from revolving, and thus it prevents the revolution of the disk $f$.

The breakers $c$ have their upper ends extended upward from the upper series of arms $d\ d'$ to such a height that they will project above the surface of the milk. In making the channels I extend the breakers nearly to the top of the body $a$, as shown. In the operation of the device it will be seen that the extensions $c'$ revolve close to the periphery of the fixed disk $f$.

In the operation of the churn the disks are submerged. The milk is drawn through the openings $f'$ into the channels $f$, and is thence drawn between and pressed by the close contact of the disks, and the globules are broken. The declination of the under disk causes the milk to pass more readily to the periphery, whence it is discharged.

By reference to the drawings it will be seen that the openings $e^2$ in the under disk alternate in position with the openings $f^2$ in the upper disk. The two disks working close together, a suction will be created which will draw the milk upward through the openings $e^2$, and these openings are so arranged that they will not pass directly under the openings $f$, which, if they did so pass, would, by reason of the two opposing currents, operate to lessen or seriously check the suction through the said openings $e^2$. The construction of the cross-arms $d\ d'$ and of the breakers $c$ is such that they keep the milk constantly eddying, and they also act to throw the milk upward from the bottom. All particles of the milk are thus brought in contact with the disks. The fixed disk $f$ being submerged prevents the entire body of milk from being drawn into one continuously-flowing current around the shaft $b$.

The suction created by the two disks is so great that the milk is drawn rapidly between them, and every globule will be broken. I am enabled to do any ordinary churning in a very few minutes, and with very little labor by the operator.

I have shown in the drawings only one pair of disks. A second pair could be placed between the upper and under series of arms $d\ d'$ at any desired point, as that marked by the letter $m$. It would require only ordinary mechanical skill to construct the breaker or paddle frame and arrange the necessary connections whereby the second pair of disks could be held and operated. It will be understood that if the under disk was held stationary and the upper one revolved, and both be submerged, that the same results will be obtained as when held and operated as shown and hereinbefore described. For ordinary farm dairy purposes only one set of disks are needed.

I have also shown and described one of the disks as stationary. Both disks may be made to revolve in opposite directions by means of proper bevel-gearing and the proper construction of the upper end of the hollow shank $g$.

I have also shown the disks constructed conical-shaped, so as to give a fall or descent toward the rims. Flat disks will give good results; but they must be revolved at a higher rate of speed in order that the broken milk will be thrown out by centrifugal force. The construction shown in the drawings is the preferable one, for by it milk, by its own gravity, would move to the periphery of the disks.

I have also found that the two grinding-disks, when submerged in the milk, and unaided by paddles or other agitating mechanism, will break the milk; but the operation is much slower. The suction from above and below the disks and the discharge at the periphery will cause all particles of the milk to come in contact with and pass between said disks. These disks can be employed in churns in which the shaft $b$ is placed in a horizontal position. This would place the disks on their edges, and they would revolve in a vertical plane instead of in the horizontal plane, as shown in the drawings. If the disks be submerged, they will operate in any position. If set to revolve in a vertical plane, as hereinbefore indicated, they will break the milk if submerged in part of their vertical diameter. I however prefer the construction and arrangement shown in my drawings.

Having thus described my invention, what I claim, and desire to secure by Letters Patent, is—

1. In a churn, the two perforated suction-disks placed in contact one above the other, and having a diameter less than the diameter of the churn to permit a free circulation of the milk around them, submerged in the body of the milk, and means whereby they are operated and the milk drawn between them from above and below by suction, substantially as set forth.

2. The combination, in a churn, of the paddle-frame having upright bars $c'$ fixed on the ends of the radial arms and extended upward above the said radial arms, and the suction-disk $e$, having a diameter slightly less than the diameter of the paddle-frame and fixed on the shaft thereof above the upper set of radial arms, with the disk $f$, fitted snugly to and coinciding with the disk $e$, the upper ends of the said bars $c'$ being carried upward past and revolving about the periphery of the upper disk, substantially as set forth.

3. In a churn, the disks $e$ and $f$, having a diameter less than the diameter of the churn, and provided with a series of radial channels, $e'$ and $f'$, perforated by openings $e^2$ and $f^2$, and having the surfaces between said channels plain and arranged to rub one against the other, and supported within the churn below the surface of the body of the milk, and operated substantially as set forth.

In testimony whereof I affix my signature in presence of two witnesses.

CYRUS J. BROWN.

Witnesses:
A. PARKER,
FRANK GRINER.